June 8, 1943.    G. H. SCHNITZER    2,321,160
PISTON CONSTRUCTION
Filed May 22, 1942    2 Sheets-Sheet 1

INVENTOR.
GEORGE H. SCHNITZER
BY
ATTORNEYS.

June 8, 1943.                G. H. SCHNITZER                2,321,160
                              PISTON CONSTRUCTION
              Filed May 22, 1942                     2 Sheets-Sheet 2

INVENTOR.
GEORGE H. SCHNITZER
BY Fay, Macklin, Golrick
Williams, Chilton and Isler.
ATTORNEYS Patented June 8, 1943

2,321,160

UNITED STATES PATENT OFFICE 2,321,160

PISTON CONSTRUCTION

George H. Schnitzer, Cleveland, Ohio

Application May 22, 1942, Serial No. 444,145

9 Claims. (Cl. 309—4)

This invention relates, as indicated, to piston construction, but has reference more particularly to fluid pressure devices, as for example, a piston for use in hydraulically-operated mechanisms.

A primary object of the invention is to provide an improved piston which is capable of forming a highly efficient seal with the wall of a confining cylinder, so as to prevent the escape of fluid past the piston.

Another object of the invention is to provide a device of the character described which is automatic in its operation.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 1:
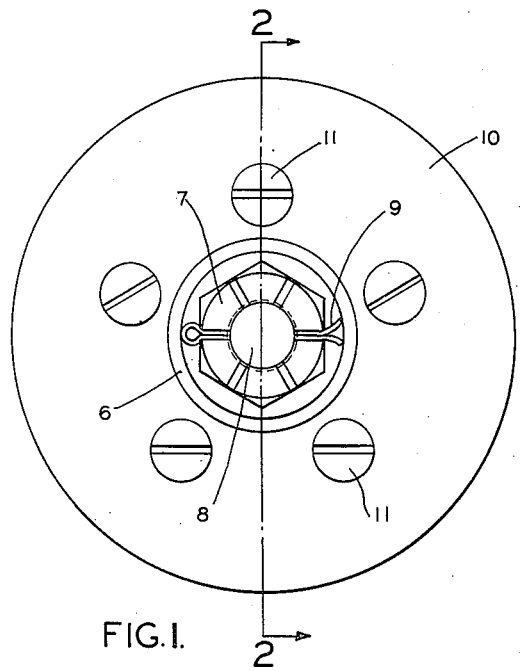
Fig. 1 is an elevational view of one form of a piston embodying the invention.
Figure 2:
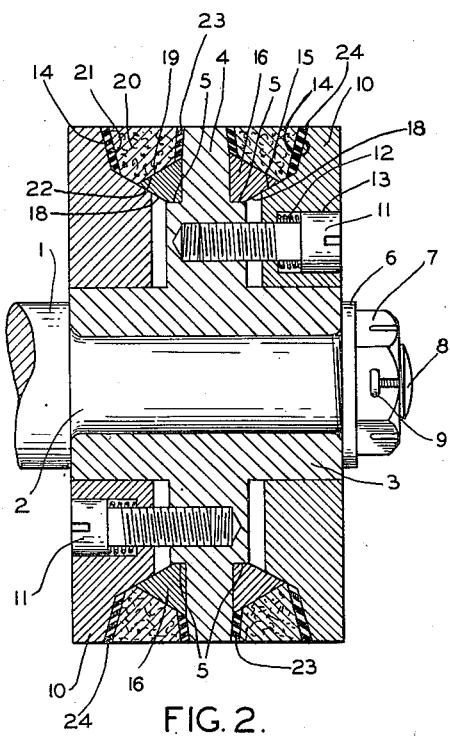
Fig. 2 is a cross-sectional view, taken on the line 2—2 of Fig. 1.
Figure 3:
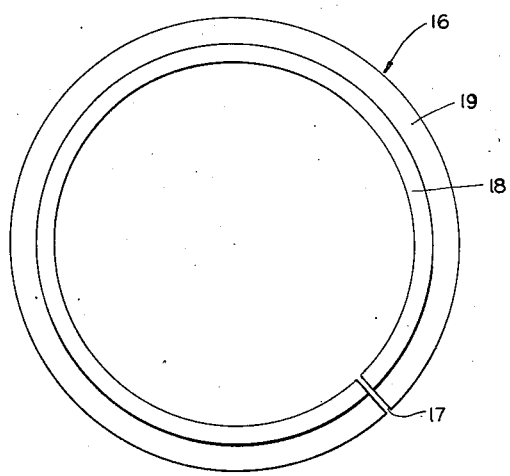
Fig. 3 is a plan view of the annular wedge elements incorporated in the device of Figs. 1 and 2.

Referring more particularly to Figs. 1, 2 and 3, it will be seen that in this form of the invention, the device consists of a piston adapted for movement in a cylinder, (not shown), and comprising a rod 1 terminating in a reduced stem 2 upon which is mounted the piston body which consists of a hub portion 3 and a radially extending flange 4, the outer portion of which is of reduced thickness forming shoulders 5, which serve a purpose to be presently described. The piston body is retained in position upon and against axial movement relatively to the stem 2 by means of a washer 6, which, in turn, is secured against the hub portion of the piston body by means of a nut 7 secured to a reduced threaded extension 8 of the stem 2, a cotter pin 9 locking the nut against rotation.

Mounted upon the hub 3 are annular caps or followers 10, which are normally spaced from the flange 4 and are secured to the latter by means of socket-head screws 11, springs 12 being interposed between the heads of these screws and the bottoms of the recesses 13 in the caps in which the heads of these screws are disposed. The followers 10 are slidable relatively to these screws, and the springs 12 act normally to force the caps 10 toward the flange 4.

The caps or followers 10 are provided on their inner faces with annular surfaces 14 and 15 which are inclined relatively to the axis of the piston.

Mounted on the shoulders 5, to which reference has previously been made, are annular wedge elements in the form of rings 16, which are split as at 17, so as to make the rings freely expansible. In the unexpanded condition of these rings, the ends of the rings adjacent the split or slit 17, are substantially in contiguity with each other, as shown in Fig. 3. These rings 16 are provided with radially-inward surfaces 18 which are inclined at the same angle as the surfaces 15 and rest upon the latter surfaces. They are also provided with radially-outward surfaces 19 which are inclined oppositely to the surfaces 18 and which form supporting surfaces for packing rings 20, of any desirable packing material, these packing rings having surfaces 21 which are inclined similarly to the surfaces 14 of the caps and surfaces 22 which are inclined similarly to the surfaces 19 of the rings 16. Sealing rings 23 of rubber or like substance are interposed between the flange 4 and the packing rings 20, and sealing rings 24, of a similar substance are interposed between the surfaces 21 of the packing rings and the surfaces 14 of the caps 10.

The operation of the above-described device may now be briefly described as follows:

In the absence of any external influences, the natural tendency of the rings 16 to contract is sufficient to overcome the tendency of the springs 12 to force the caps or followers 10 towards the flange 4, with the result that the parts are in a relationship to each other as shown in Fig. 2.

With each stroke of the piston, however, the fluid, such for example, as air, oil, steam or water, which actuates the piston, will exert pressure on one or the other of the caps 10, with the result that the cap against which pressure is thus applied, will move axially relatively to the hub 3, expanding the ring 16 by virtue of the interengagement of the inclined surfaces 15 and 18. This causes an outward pressure to be applied by the ring 16 to the packing ring 20 by virtue of the interengagement of the surfaces 19 and 22, so that the packing ring in turn exerts a pressure on the cylinder wall which is effective to prevent the escape of the actuating fluid between the piston and cylinder wall.

It will be understood that when the piston is moving in one direction, the packing ring on only that end of the piston adjacent the applied pressure is actuated to provide the aforesaid sealing effect, and that the other packing ring remains unaffected. Accordingly, the packing rings are pressed outwardly alternately, so that the seal is, in effect, a double-acting seal.

As the packing ring becomes worn, the wear is automatically taken up by the conjoint action of the springs 12, caps 10 and rings 16. The rubber sealing rings 23 and 24 act to prevent washing of the packing rings and entry of the fluid into the interior of the piston.

It is apparent that the foregoing device provides an effective means for transmitting power and absorbing shocks, and at the same time provides a constant and positive seal between the piston and cylinder wall, which seal is automatically or self-adjusting to take up wear.

Figure 4:
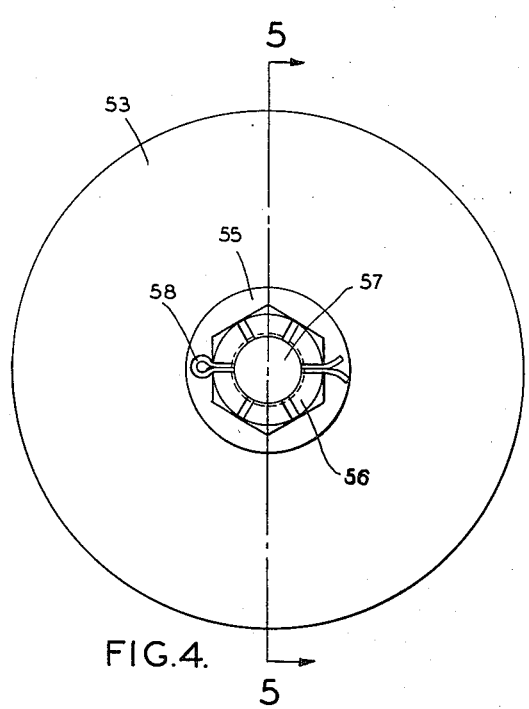
Fig. 4 is an elevational view of a modified form of piston.
Figure 5:
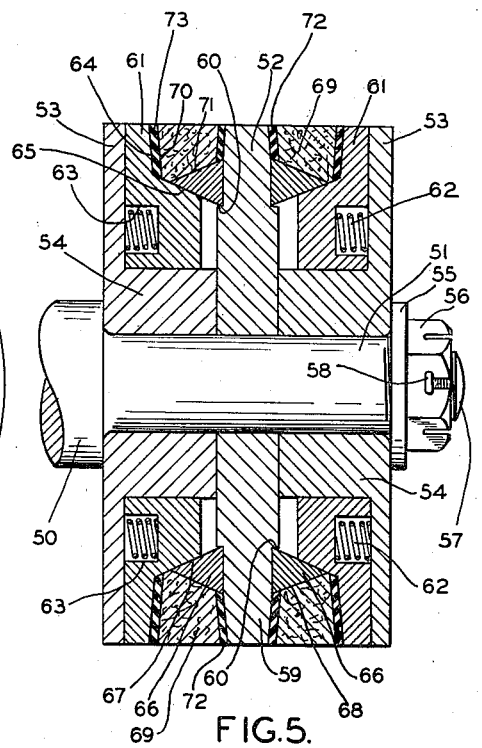
Fig. 5 is a cross-sectional view, taken on the line 5—5 of Fig. 4.

In that form of the invention shown in Figs. 4 and 5, the rod 50 terminates in a reduced stem 51 upon which is mounted the piston body which consists, in this case, of a central plate 52 and caps or end plates 53 having hub portions 54 which are in abutment with the sides of the plate 52. The plates 52 and 53 are retained in position upon and against axial movement relatively to the stem 51 by means of a washer 55 which, in turn, is secured against the hub portion of the outer plate 53 by means of a nut 56 secured to a reduced threaded extension 57 of the stem 51, a cotter pin 58 locking the nut against rotation.

The plate 52 has an annular peripheral portion 59 of reduced thickness, forming shoulders 60, which serve a purpose to be presently described.

Mounted upon the hub portions 54 of the plates 53 are annular followers 61 which are normally spaced from the plate 52, but are at all times pushed toward the latter by means of springs 62 disposed in recesses 63 in the followers 61 and bearing at one end against the plates 53 and at the other end against the followers.

The followers 61 are provided on their inner faces with annular surfaces 64 and 65 which are inclined relatively to the axis of the piston.

Mounted on the shoulders 60, to which reference has previously been made, are annular wedge elements in the form of freely expansible split rings 66. In the unexpanded condition of these rings, the ends of the rings adjacent the split are substantially in contiguity with each other. These rings 66 are provided with radially inward surfaces 67 which are inclined at the same angle as the surfaces 65 and rest upon the latter surfaces. They are also provided with radially-outward surfaces 68 which are inclined oppositely to the surfaces 67 and which form supporting surfaces for packing rings 69 of any desirable packing material, these packing rings having surfaces 70 which are inclined similarly to the surfaces 64 of the followers, and surfaces 71 which are inclined to the surfaces 68 of the rings 66. Sealing rings 72 of rubber or like substance are interposed between the portion 59 of the plate 52 and the packing rings 68, and sealing rings 73 of a similar substance are interposed between the surfaces 70 of the packing rings and the surfaces 64 of the followers 61.

In the operation of the device shown in Figs. 4 and 5, the action of the springs 62 is sufficient to cause the followers at all time to be biased towards the plate 52, thus forcing the packing rings, through the conjoint action of the followers and rings 66, to move radially outwardly towards the cylinder wall, and thereby providing a highly effective and efficient fluid seal.

The springs 62, moreover, are effective to automatically take up wear in the packing rings and other parts. It will be noted, in this form of the invention, that the sealing and wear take-up features are effective in either direction of movement of the piston in the cylinder.

Figure 6:
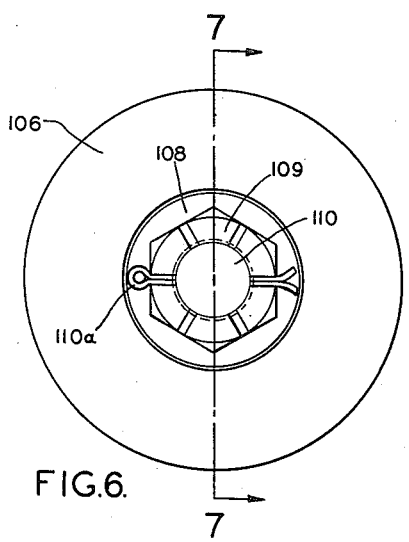
Fig. 6 is an elevational view of another modified form of piston.
Figure 7:
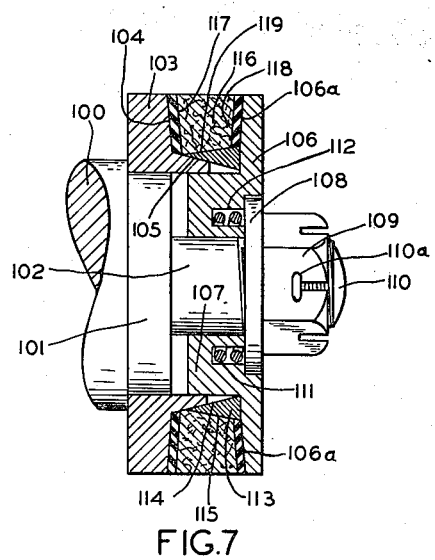
Fig. 7 is a cross-sectional view, taken on the line 7—7 of Fig. 6.

That form of the invention shown in Figs. 6 and 7, is adapted for small diameter pistons. In this case, the rod 100 is provided with a portion 101 of slightly reduced diameter and a stem 102.

The portion 101 of the rod 100 has mounted thereon a cap or end member 103 which overhangs the portion 101 and has annular surfaces 104 and 105 which are inclined angularly to the axis of the piston.

The stem 102 has slidably mounted thereon a follower 106 having an inclined surface 106a and a hub portion 107 which is normally spaced from the portion 101 of the rod and extends into the overhanging portion of the member 103. The follower 106 is retained in position upon the stem 102 by means of a washer 108, which, in turn, is retained in position by means of a nut 109 secured to a reduced threaded extension 110 of the stem 102, a cotter pin 110a locking the nut against rotation.

A coil spring 111 is mounted in an annular recess 112 of the follower 106 and bears at one end against the washer 108 and at the other end against the follower. This spring acts to normally force the follower plate towards the portion 101 of the rod 100.

Mounted on the hub portion 107 of the follower 106 is an annular wedge element in the form of a split freely expansible ring 113. This ring is provided with a radially inward surface 114 which is inclined at the same angle as the surface 105 and rests upon the latter surface. It is also provided with a radially-outward surface 115 which is inclined oppositely to the surface 114 and which forms a supporting surface for a packing ring 116 similar to the previously described packing rings. This packing ring has surfaces 117 and 118 which are inclined similarly to the surfaces 104 and 106a of the member 103 and follower 106 respectively, and also has a surface 119 which is inclined similarly to the surface 115 of the ring 113.

The operation of this form of the device is similar to that of the device shown in Fig. 1, except that in this case, only the follower 106 is movable relatively to the stem 102.

As the fluid strikes the follower, the follower will move axially on the stem 102, expanding the ring 113 by virtue of the interengagement of the inclined surfaces 105 and 114. This causes an outward pressure to be applied by the ring 113 to the packing ring 116 by virtue of the interengagement of the surfaces 115 and 119, so that the packing ring in turn exerts a pressure on the cylinder roll, which is effective to prevent the escape of the actuating fluid between the piston and cylinder wall.

As the packing ring becomes worn, the wear is automatically taken up by the conjoint action of the spring 111, follower 106 and ring 113.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the character described, a member, a second member movable axially relatively to said first member, one of said members having an annular surface inclined to the axis of the other member, a wedge ring having radially-inward and radially-outward surfaces inclined to said axis, said radially-inward surface bearing on said first-named annular surface, and a packing ring interposed between said members and having an annular inclined surface bearing on the radially-outward surface of said wedge ring.

2. In a device of the character described, a piston rod, a piston body mounted thereon, said piston body comprising a member, a follower member movable relatively to said first-named member, one of said members having an annular surface inclined relatively to the axis of said rod, an expansible wedge ring interposed between said members and having a radially-inward surface bearing on said inclined surface, and a radially-outward surface inclined in a direction substantially opposite to that of the radially-inward surface, and a packing ring interposed between said members and having an annular surface bearing on said radially-outward surface of the wedge ring.

3. A device as set forth in claim 2, and means for resiliently urging said follower member relatively to said first-named member.

4. In a device of the character described, a piston rod, and a piston body mounted on said rod, said body comprising a hub portion and a radially extending flange, annular followers slidably mounted on said hub portion, and movable relatively to said flange, means securing said followers to said flange and limiting movement of the followers away from said flange, said followers having annular surfaces inclined relatively to the axis of said piston rod, annular split wedge rings mounted on said flange and having radially-inward inclined surfaces bearing on the inclined surfaces of said followers, and having also radially-outward surfaces inclined to the axis of said rod, and packing rings disposed between said flange and followers, said packing rings having inclined surfaces bearing on said radially-outward surfaces.

5. A device, as set forth in claim 4, in which said follower securing means comprises screws secured to said flange and having heads disposed in recesses in said followers.

6. A device as set forth in claim 4, in which said follower securing means comprises screws secured to said flange and having heads disposed in recesses in said followers, and in which springs are disposed in said recesses between said heads and the bottoms of the recesses.

7. In a device of the character described, a piston rod, and a piston body, said body comprising a central plate, end plates having hub portions in abutment with said central plate, annular followers mounted on said hub portions and normally spaced from said central plate, means resiliently biasing said followers toward said central plate, said followers having annular surfaces inclined relatively to the axis of said rod, annular expansible wedge rings supported by said central plate and having surfaces bearing on the inclined surfaces of said followers and other annular surfaces angularly related to the surfaces which bear on said followers, and packing rings interposed between said central plate and said followers, said packing rings having inclined surfaces bearing on said angularly related surfaces of the wedge rings.

8. In a device of the character described, a piston rod, a piston body, said body comprising a follower member, a follower movable relatively to said member, spring means biasing said follower toward said follower member, a wedge ring, and a packing ring, said member and wedge ring having coacting inclined surfaces whereby movement of said surfaces toward each other results in an outward pressure upon said packing ring.

9. In a device of the character described, a member, a second member movable axially relatively to said first member, one of said members having an annular surface inclined to the axis of said members, a wedge ring having a radially-inward surface inclined to said axis, said radially-inward surface bearing on said first-named annular surface, and a packing ring interposed between said members.

GEORGE H. SCHNITZER.